United States Patent
Rasums

[19]

[11] Patent Number: 6,026,458
[45] Date of Patent: Feb. 15, 2000

[54] SYSTEM WITH PLUGGABLE ADAPTER CARD AND HOT-SWAP INTERFACE CONTROLLER

[75] Inventor: Todd Morgan Rasums, Cary, N.C.

[73] Assignee: International Business Machines Corporation, Armonk, N.Y.

[21] Appl. No.: 08/950,031

[22] Filed: Oct. 14, 1997

[51] Int. Cl.⁷ .................................................. G06F 13/00
[52] U.S. Cl. .................. 710/103; 710/102; 713/340; 714/24; 714/36
[58] Field of Search ..................... 395/281–283, 395/309, 311, 750.01, 750.02, 750.06, 750.07, 750.08, 182.22, 183.12

[56] References Cited

U.S. PATENT DOCUMENTS

| | | | |
|---|---|---|---|
| 4,245,270 | 1/1981 | Busby | 361/58 |
| 4,808,905 | 2/1989 | Chen et al. | 323/222 |
| 5,272,584 | 12/1993 | Austruy et al. | 361/58 |
| 5,428,523 | 6/1995 | McDonnal | 363/71 |
| 5,479,090 | 12/1995 | Schultz | 323/284 |
| 5,530,302 | 6/1996 | Hamre et al. | 307/147 |
| 5,568,610 | 10/1996 | Brown | 395/185.01 |
| 5,644,731 | 7/1997 | Liencres et al. | 395/283 |
| 5,748,912 | 5/1998 | Lee | 395/282 |
| 5,754,797 | 5/1998 | Takahashi | 395/283 |
| 5,758,102 | 5/1998 | Carey et al. | 395/283 |
| 5,764,926 | 6/1998 | Fukuda et al. | 395/283 |
| 5,861,737 | 1/1999 | Goerke et al. | 323/282 |
| 5,898,844 | 4/1999 | Thompson | 710/103 |

*Primary Examiner*—Ayaz R. Sheikh
*Assistant Examiner*—Raymond N Phan
*Attorney, Agent, or Firm*—Joscelyn G. Cockburn

[57] ABSTRACT

A hot-swap controller for use in an electrical machine (such as a computer) includes a P-ch MOSFET device operatively coupled to a ramp generator and a sensing error amplifier. A negative feedback loop interconnects the positive terminal of the amplifier with the output terminal of the P-ch MOSFET device and the negative terminal of the amplifier is coupled to the ramp generator. The error voltage generated by the amplifier drives the MOSFET device. The controller allows circuit cards to be inserted and/or removed, "Hot-Plugged", while the machine is operational without causing any deleterious effect on the operation of the machine.

19 Claims, 3 Drawing Sheets

SYSTEM WITH PLUGGABLE ADAPTER CARD AND HOT-SWAP INTERFACE CONTROLLER

BACKGROUND OF THE INVENTION

1. Field of the Invention

The present invention relates to electrical machines, such as computers, in general and, in particular, to electrical machines which can be serviced while performing its assigned tasks.

2. Prior Art

Because of increasing dependency on electrical machines in general, and computer-based machines in particular, there is a need for computer-based machines (hereafter called computers) which can be serviced while performing regular functions. A typical computer includes a motherboard and/or backplane with a plurality of adapter card slots. The adapter card slots are the receptacles for adapters which can be used to expand the capacity and functionality of the computer. Occasionally, adapters become defective and have to be replaced. To provide uninterrupted service, the computer has to be fully operational during removal or insertion of the adapters. In addition, the removal and/or insertion must not have deleterious results on the computer operations.

A technique termed "hot plugging", "hot swap", or variations thereof enables the insertion and/or removal of adapters while the computer is still active or operational. Even though hot plugging is a desirable goal, if not done properly, it can cause problems which over time adversely affect the operability of the computer system. A likely problem is pitting of the metal used on the connecting pins located on the adapter and the connector. The main cause of pitting is believed to be electrical arcing which occurs at the electrical contacts while interconnection is made or broken. Another problem is electrical noise which can adversely affect the performance of the system. The cause of this noise is believed to be the large change in current over a short period of time (di/dt) at the instance when the connection is made between power pins on the card and the socket. This problem is particularly severe when hot-plugging an adapter card with a large amount of decoupling capacitance. Finally, the large surge of current is likely to cause voltage transient onto the computer system backplane. The voltage transients can cause loss of data, incorrect program execution and, in severe situations, damage to delicate hardware components.

The prior art provides several systems for controlling "hot-plugging" of adapter cards. Even though the prior art systems work well for their intended purposes, they are plagued by problems which the present invention (described below) fixes. Usually, the "hot-plugging" systems have different circuit topologies and use different application methods. Notwithstanding, the differences, the different circuit topologies and/or different application methods, hereafter termed "solutions", can be classified as: umbilical cord solution, series resistance solution, series inductance solution, slow turn-on MOSFET solution and MOSFET/charge pump solution.

In the umbilical cord solution, a person uses a length of conductive wire or other conductive material (umbilical cord) for pre-charging the input capacitance of the adapter card. An auxiliary power source is required. The person uses the wire to interconnect the card to the auxiliary power source. Once the card is charged to a desired level, it is "hot-plugged" in the machine.

The drawback with the umbilical cord approach is that its success depends on the operator. If the operator inadvertently or otherwise fails to pre-charge the card or pre-charges it below an acceptable level, spikes (voltage and/or current) will result when the card is inserted in the machine. As discussed above, the spikes could damage the machine and/or cause data errors.

The series Resistance and Slow-Turn-On-MOSFET solutions require placing a resistor and MOSFET in series with the input voltage supply path. The problem with this solution is that the charge time required for pre-charging the card capacitance can be unacceptably long, especially for systems which incorporate the use of staggered pins and require stabilization of the logic supply before signal pins on the card and the backplane of the system are connected. Failure to stabilize the logic supply before connecting the signal pins could result in latch-up condition.

The series induction solution requires the placing of an inductance in series in the input voltage supply path. The solution is intended to limit the di/dt during card insertion to prevent the pins from arcing. However, the added inductance increases the likelihood of pin arcing during the removal of the card as the inductor attempts to maintain current flow during the separation of the power pin contacts.

Finally, the source-follower MOSFET (with controlled gate ramp) solution is the most recent and prevalent method used to charge capacitance on a card. This method configures a series-pass MOSFET as a source-follower whose gate is ramped to provide a controlled turn-on for the adapter card. Such topology, however, requires the implementation of a charge-pump DC/DC converter as the ramp voltage must exceed the adapter Vcc by several volts. The added converter and related circuitry not only increase the cost of the system, but also the complexity of the design. Secondly, the charge-pump's turn-on delay can be unacceptably long, especially for systems which incorporate the use of stagger pins and require the logic supply to stabilize before the signal pins are connected to avoid latchup. In such applications, the additional use of a data bus buffer switch is often required to prevent latchup condition.

Consequently, there is a need for an improved hot-plug system, hereinafter called "Hot-Swap Controller", which automatically controls the establishment of a desired voltage on a card so that the card can be hot-plugged into a machine without deleterious effects.

SUMMARY OF THE INVENTION

It is, therefore, an object of the present invention to provide a hot-swap controller which charges the capacitance on a card so that it can be hot-plugged with none or minimal data disturbance and none or minimal pin damage.

It is another object to provide a system which is low cost, simple, easily integrated into a module, yet still effective in allowing a card to be hot-plugged without damage to the card and/or system in which it is hot plugged.

The object and others are attained by a hot-swap controller positioned on the card and in series with the input power port of the card. The controller includes a P-ch MOSFET transistor, a ramp generator coupled to the source terminal of the transistor and a negative feedback loop (including an error amplifier). The error amplifier correlates voltages at the drain (D) terminal of the transistor and the ramp generator to provide the error signal that drives the Gate (G) terminal of the transistor. The sequencing of voltage (Vbulk) and bus interface signals are provided by multi-length pins in the card receptacle slot.

In particular, the hot-swap controller circuit topology is such that, upon card insertion, the Vbulk voltage potential provided from pins in the receptacle biases the ramp generator, causing a voltage ramp of constant dv/dt to be seen at the reference (−) input of the error amplifier. A voltage proportional (resistive-divided) to the controller's output voltage is fed back to the positive (+) input of the error amplifier, forming a negative feedback loop. The error amplifier output voltage modulates the gate of the series-pass P-ch MOSFET in such a way as to minimize the voltage difference seen between the positive and negative inputs of the error amplifier. Thus, through this feedback mechanism, the hot-swap controller's output tracks proportionately the voltage of the ramp generator. If the load connected to the controller's output is predominately capacitive in nature, the input current flowing into the adapter card will be constant during this period. Once the controller output voltage has reached its final steady-state potential, the ramp voltage will begin to exceed the resistive-divided voltage fed back from the controller output. In an attempt to make these two voltages equal, the error amplifier output provides maximum overdrive to the MOSFET which places it in a (desirable) switched state characterized by low channel resistance. The adapter card's input power port has now been fully energized.

With the power port fully energized, the signal pins (the shortest ones in the card receptacle) is brought into contact with the signal bus on the card. Because the voltage on the card must be stabilized before the signal pins contact with the signal bus on the card, the time for charging the cards capacitance is less than the time required for the signal pins to contact the signal bus.

In one feature of the invention, the controller includes an On/Off control signal line. This feature provides a mechanism which can be used to power down the card prior to its removal from the card slot.

DETAILED DESCRIPTION OF THE PREFERRED EMBODIMENT

Figure 1:
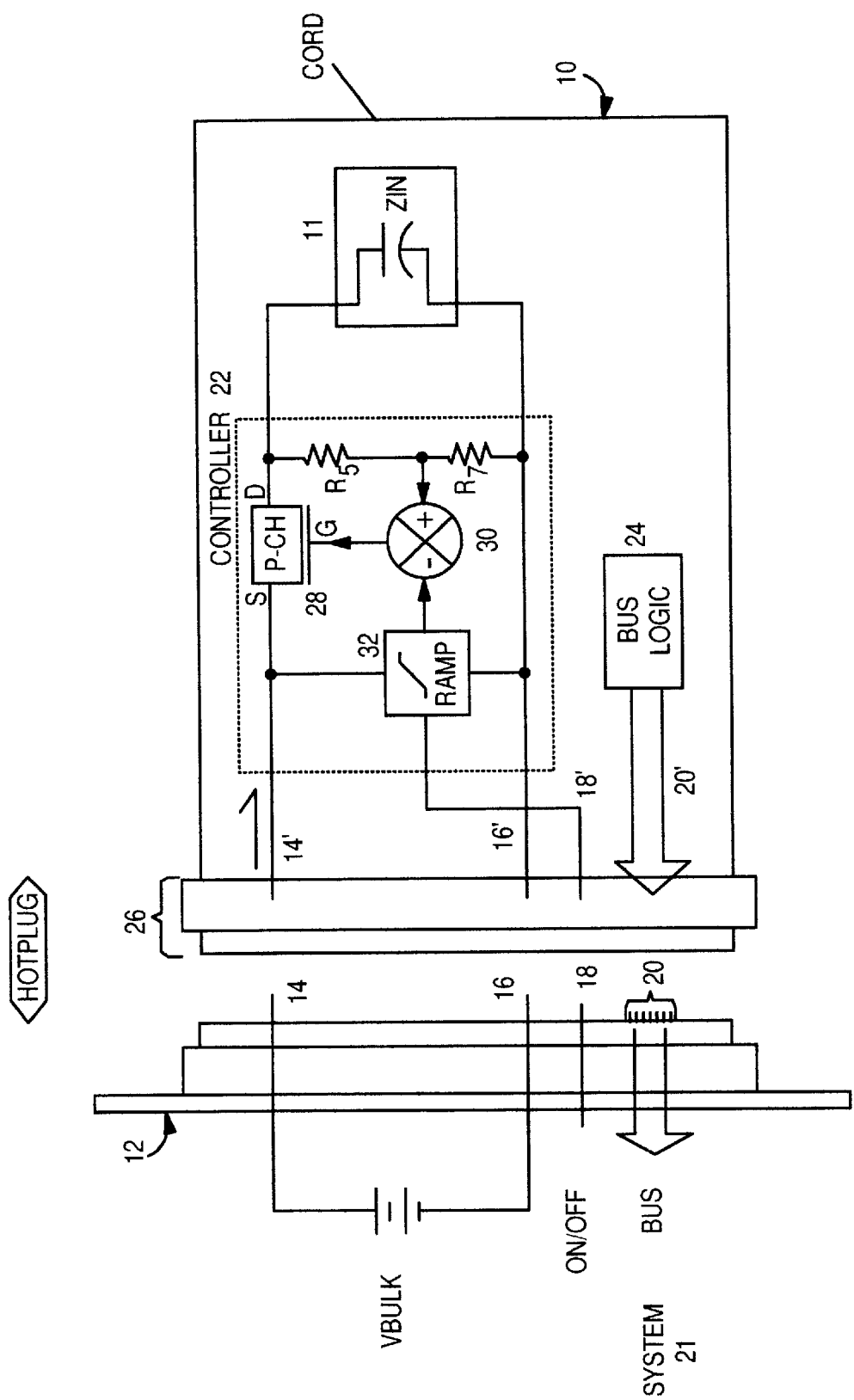
FIG. 1 shows an implementation of the present invention with the card positioned to be hot-plugged into a card slot.

FIG. 1 shows a system in which adapter card 10 is positioned to be hot-plugged into card slot 12. The card slot 12 could be the motherboard of a computer and/or the backplane of a group of machines termed hubs servers or the like. The slot 12 is provided with power supply pins 14 and 16, on/off pin 18 and a plurality of signal carrying pins 20. The power pins 14 and 16 are connected to a bulk voltage (Vbulk) which is also coupled to a processor-based system to be discussed below. The power pins 14 and 16 are the longest of the all the pins and are such that, when card 10 is hot-plugged into slot 12, pins 14 and 16 are the first ones to be electrically connected to conductor 14' and 16' on the card. Likewise, on/off pin 18 next connects with conductor 18', and signal conductors 20 are last to connect to card signal bus 20'. By contacting the pins in the order suggested, the controller 22 ensures that the supply voltage is fully established on the card before the respective signal busses are connected. The direction of current flow in the card is shown by the arrow labeled "$I_{in}$". Likewise, the direction to insert or remove the adapter card 10 is shown in the direction of the arrow labeled "Hotplug". As is used in this document, the term "HOTPLUG" refers to the state of signals in the slot 12. In particular, the signal on the aforementioned pins are active when the card is either inserted or removed from the slot.

Still referring to FIG. 1, the adapter card 10 includes bus logic 24 coupled by card signal bus 20' to signal pins 20 in the slot 12. The bus logic 24 is a conceptual showing of the various electrical and microelectronic components which may be embedded on the adapter card 10. Bus logic 24 may provide any one of various functions currently available or yet to be developed for use by a processor-based system. As is evident from FIG. 1., when the card is fully inserted in slot 12, bus logic 24 is coupled through card bus 20' to the system bus 21. Thus a processor in the processor-based system, to be described subsequently, can communicate information from the card to the processor or vice versa.

Still referring to FIG. 1, the controller 22 is positioned in series in the power port 14' and 16' of the adapter card 10. The function of the controller is to control the rate at which current is distributed on the card so that the load on the card, represented by a capacitor with an input impedance, Zin, is charged in a controlled manner, not to adversely affect the rest of the system electrically coupled to slot 12. Even though, the load Zin is shown as a capacitive load, other types of load can be used for representing total electrical load on the card.

Zin in turn distributes electrical power to bus logical 24. The distribution system, such as conventional wiring, can be used for distributing voltages on the card. Such distribution systems is well known in the technology and will not be discussed further. In addition, connector 26 is connected, using any of the well known conventional means, to adapter card 10. The connector 26 is inserted into slot 12. The method for interconnecting Vbulk to pins 14, 16, the system bus 21 to signal pins 20, and the respective signal carrying wires 20 to connector 26 are well known in the art and will not be described further.

Still referring to FIG. 1, the controller 22 basically includes a switching device 28, error amplifier 30 and ramp generator 32. A voltage adjusting circuit arrangement formed by resistors R5 and R7 couple the drain terminal of the switching device to the positive terminal of the error amplifier 30. Likewise, ramp generator 32 has an input coupled to the power port identified by numeral 14' and 16' of the controller and an output coupled to the negative port of the error amplifier. As will be explained subsequently, the error amplifier correlates the output signal from ramp generator 32 with the feedback signal and generates an error signal for driving the gate of the switching device 28.

Figure 2:
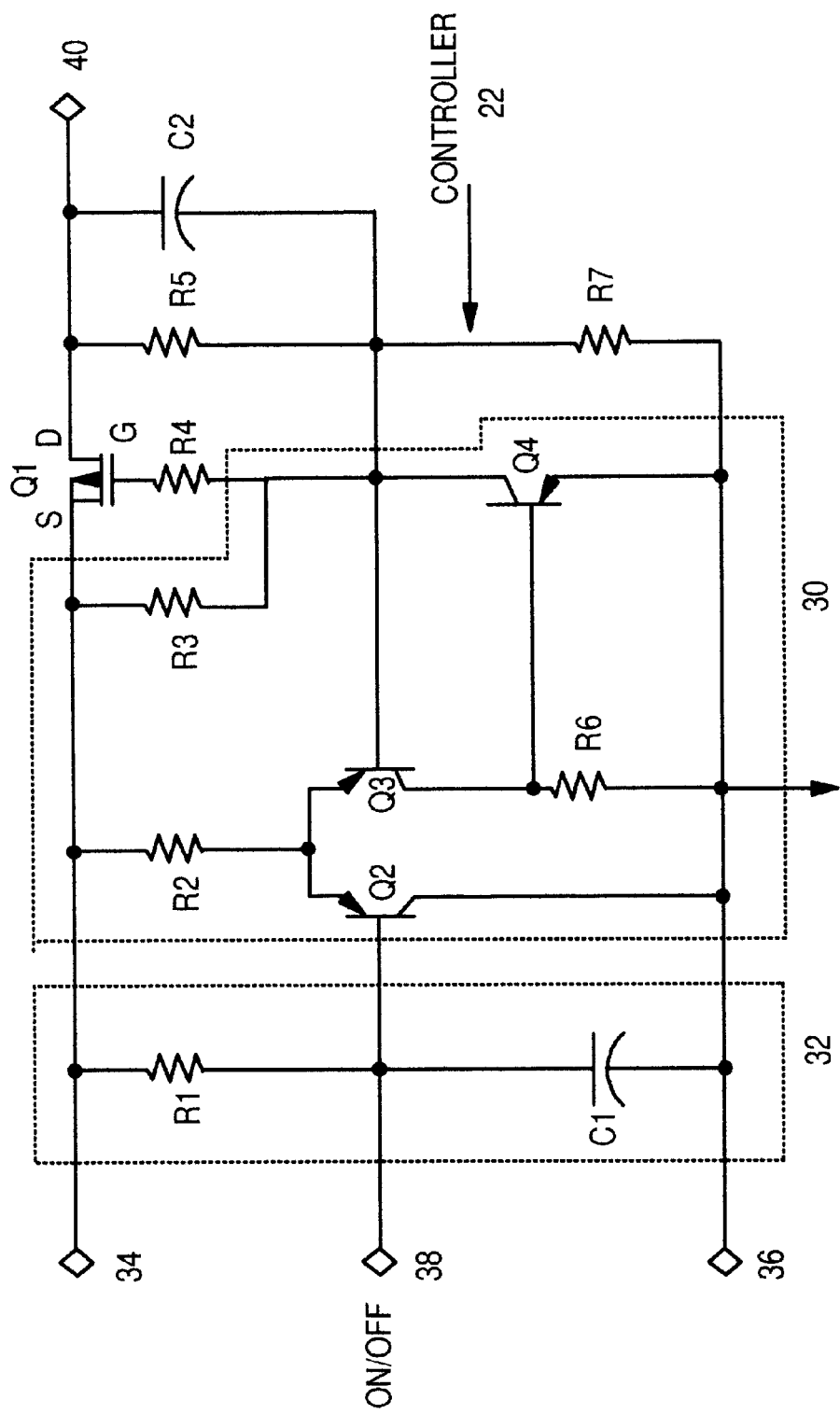
FIG. 2 shows a circuit diagram of the present invention.

FIG. 2 shows a circuit diagram of controller 22. For consistency, common components in FIG. 1 and FIG. 2 are identified by like numerals and are enclosed in the dash lines. The controller 22 includes ramp generator 32, error amplifier 30, switch $Q_1$, and voltage divider R5 and R7. When the card is inserted in slot 12, FIG. 1, terminals 34 and 36 are connected to the +5 voltage level and ground reference level, respectively. The length of pins 14 and 16 are the longest in the slot 12 and make the first connection. Terminal 38 is an on/off terminal and is connected to pin 18, subsequent to the connection of pins of 34 and 36. Terminal 40 is the terminal that distributes the Vcc on the adapter card. In the preferred embodiment of this invention, Vcc is equal to 5 volts. It should be noted that other voltage levels can be generated without deviating from the scope or spirit of the present invention.

Still referring to FIG. 2, the ramp generator 32 includes resistor R1 connected in series with capacitor C1. The error amplifier 30 includes components R2, Q2, Q3, R3, Q4 and R6. The components of the error amplifier are interconnected in the manner shown in FIG. 2. Preferably, the switching device $Q_1$ is a series pass P-channel MOSFET transistor in which the gate terminal is connected by R4 to the collector of Q4. A voltage adjustor formed by series connected resistors R5 and R7 form a feedback loop into the summing amplifier. A capacitor C2 connects the base of Q3 to the positive voltage supply rail. It should be noted that this circuit is an example and it is well within the skill of the art to change the value of components or configurations without deviating from the scope and spirit of the present invention. Table 1 below sets forth values that could be used for the components of the controller. Again, it should be noted that these values are merely representative and do not limit the scope of the invention in any way.

TABLE 1

| COMPONENTS | VALUES |
| --- | --- |
| R1 | 39K |
| R2 | 1K |
| R3 | 1K |
| R4 | 1K |
| R5 | 10K |
| R6 | 1K |
| R7 | 5K |
| C1 | 0.22µ |

Figure 3:
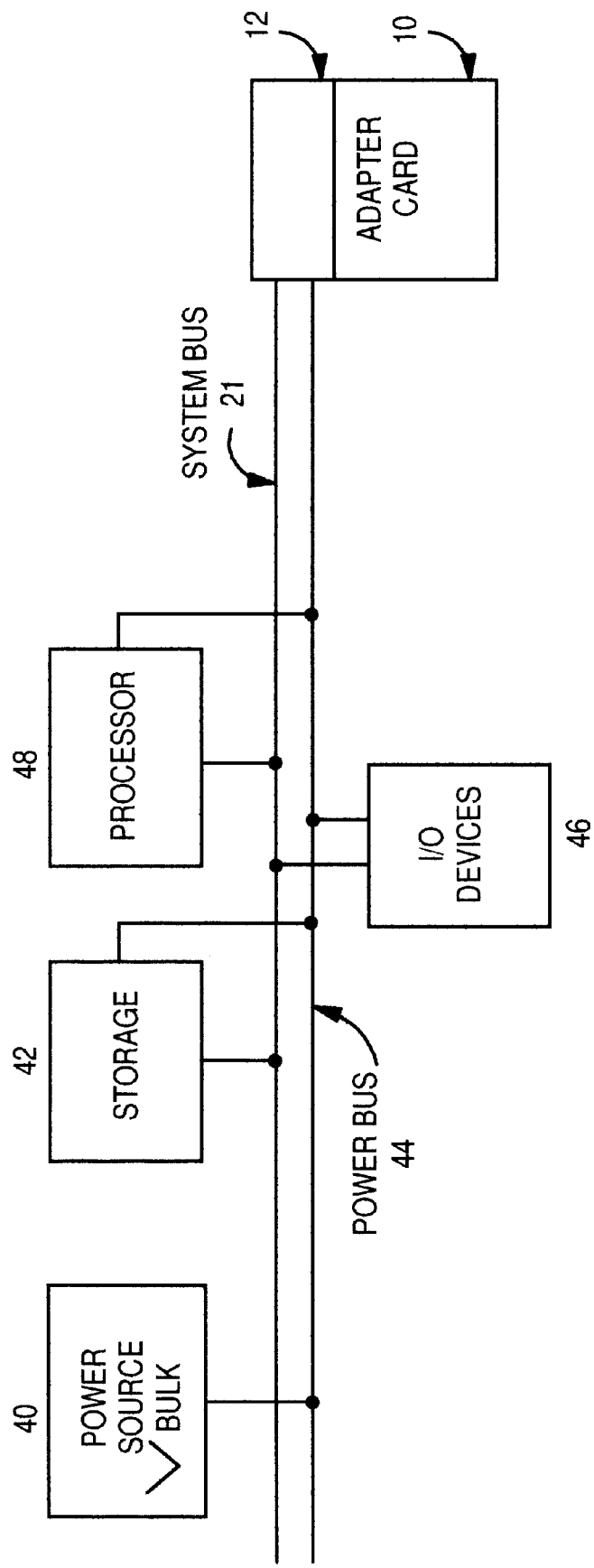
FIG. 3 shows a processor-based system in which the present invention is used.

FIG. 3 shows a processor-based system which uses the teachings of the present invention. The processor-based system includes system bus 21 and power bus 44. The system bus 21 distributes informational signals within the system, while power bus 44 distributes power. Slot 12 is operatively coupled to the system bus 21 and the power bus 44, and adapter card 10 is shown inserted in slot 12. I/O devices 46 include any of the well known I/O devices including display devices, keyboard, etc. The I/O devices are connected by separate conductors to the system bus 21 and the power bus 44. Processor 48 is connected to the system bus 21 and power bus 44 by different conductors. The power source 40 is connected to the power bus 44. Finally, storage 42 is coupled to the power bus 44 and the system bus 21. As is obvious from the figure when distributing the data or command signal, the system bus 21 is used. Likewise, when power is distributed to the various components, it is done via power bus 44.

A description of circuit operation will now be given. Upon insertion of the card into card slot 12, the longest pins 14 and 16 (FIG. 1) contact receptacles (not shown) connected to card power port defined by 14' and 16'. The voltage Vbulk biases the ramp generator 32. The lower portion of the RC exponential charge characteristic yields a nearly constant dv/dt voltage which is fed to the positive input of error amplifier 30 comprising of Q2, Q3, Q4, R2, R3 and R6. The R1, C1 time constant is chosen to yield the desired time duration needed to pre-charge the adapters input capacitance shown as 11, FIG. 1. A voltage proportional to the controller's output at terminal 40 which is a +5 volt Vcc is fed back to the amplifier's positive input through a resistor-divider network formed by R5 and R7. The error amplifier output transistors Q4 modulates the gate of MOSFET Q1 in such a way as to minimize the voltage difference seen between the bases of transistors Q2 and Q3. Thus, through this feed back mechanism, the controller's output tracks to voltage proportional to the ramp voltage impressed across C1. Once +5 volts Vcc is reached at terminal 40, the base terminal of Q2 becomes more positive than the base of Q3, as C1 continues to charge toward the potential of +5 Volts. Thus, the voltage at the error amplifier negative input Q2 is greater than at its positive input Q3, the amplifier's output Q4, saturates and provides maximum overdrive to MOSFET Q1. MOSFET Q1 is now placed in a switched state characterized by low channel resistance. The adapter card's input power port has now been fully energized. It should be noted that when the voltage at terminal 40 is fully charged to the maximum voltage, Vcc, the voltage on the base of Q3, is approximately one half due to the voltage divider connected to the base terminal of Q3.

To de-energize the adapter, one can simply pull the terminal 38, marked On/Off node, to ground via an external transistor or other means generated by the processor. The error amplifier output will drive towards 5 Volts, cutting off overdrive to MOSFET Q1 and prohibiting current flow to the adapter. The adapter can then be pulled from the slot without any deleterious effect on the system.

It is to be understood that the above-described arrangement is merely an illustrative application of the principles of the invention. Various changes and/or modifications may be devised by those skilled in the art without departing from the scope and spirit of the present invention.

We claim:

1. An adapter card for hot-plugging into an electrical machine, said adapter card including:

a substrate;

a plurality of electrical and microelectronic components operatively positioned on the substrate and cooperating to provide one or more desired functions;

a power distribution system operatively disposed on the substrate, said power distribution system including at least an input power port and coupled conductors distributing power to the components; and a hot-swap interface controller operatively coupled to the power distribution system, said interface controller including a switching device being operable in at least two modes with one of said modes being at least a relatively high resistive mode and a second of said mode being a relatively low resistive mode, a ramp generator operatively coupled to a terminal of said switching device, an error amplifier having a first terminal operatively coupled to the ramp generator and an output terminal operatively coupled to the switching device, and a negative feedback loop coupling a second terminal of said switching device to the error amplifier, said error amplifier being responsive to electrical signals in the negative feedback loop and electrical signals at the ramp generator to generate error signals for driving said switching device through its range of operational modes.

2. The adapter card of claim 1 wherein the switching device includes a series-pass P-ch MOSFET transistor having a source (S) terminal, a drain (D) terminal and a gate (G) terminal.

3. The adapter card of claim 1 or claim 2 further including a voltage divider circuit operatively positioned in the negative feedback loop.

4. The adapter card of claim 3 wherein the negative feedback loop includes an error amplifier.

5. The adapter of claim 4 further including means to activate/deactivate the controller.

6. The adapter card of claim 5 wherein the means includes at least one signal transmission conductor.

7. The adapter card of claim 1 wherein the ramp generator includes a resistor connected in series with a capacitor.

8. An adapter card for hot-plugging into an electrical machine, said adapter card including:
   a substrate;
   a plurality of electrical and microelectronic components operatively positioned on the substrate and cooperating to provide one or more desired functions;
   a power distribution system operatively disposed on the substrate, said power distribution system including at least an input power port and coupled conductors distributing power to the components;
   a hot-swap interface controller operatively coupled to the power distribution system, said interface controller including a switching device being operable in at least two modes with one of said modes being at least a relatively high resistive mode and a second of said mode being a relatively low resistive mode, a ramp generator operatively coupled to a terminal of said switching device, an error amplifier having a first terminal operatively coupled to the ramp generator and an output terminal operatively coupled to the switching device, and a negative feedback loop coupling a second terminal of said switching device to the error amplifier, said error amplifier being responsive to electrical signals in the negative feedback loop and electrical signals at the ramp generator to generate error signals for driving said switching device through its range of operational modes; wherein the error amplifier includes a pair of emitter coupled transistors;
   a first resistor connecting the coupled emitters to a first voltage level;
   a conductor connecting a base terminal of one of the emitter coupled transistors to a second voltage level;
   a third transistor having a base terminal connected to the collector terminal of the one of the emitter coupled transistor;
   a second resistor connecting the base terminal of said third transistor to a third voltage level;
   a conductor connecting the collector electrode of the other one of the emitter coupled transistors to the third voltage level; and
   a conductor providing an input to the base electrode of the other one of the emitter coupled transistor.

9. A circuit arrangement for use in controlling current flow between an energy source and an electrical load, said circuit arrangement including:
   a switching device including source (S) terminal, Drain (D) terminal and gate (G) terminal;
   an error amplifier with an output connected to the gate terminal;
   a ramp generating circuit with a first output connected to the source terminal, and a second output connected to a first input of the error amplifier; and
   a negative feedback loop connecting the drain electrode to a second input of said error amplifier wherein said error amplifier correlates signals from the drain terminal and signals from the ramp generator to produce an error signal for driving the gate terminal of said switching device.

10. The circuit arrangement of claim 9 further including circuit operatively coupled to the circuit arrangement and when activated enable/disable said circuit arrangement.

11. The circuit arrangement of claim 10 wherein the switch device includes a series-pass P-ch MOSFET transistor.

12. The circuit arrangement of claim 10 wherein the ramp generator includes a series connected resistive (R) capacitive (C) circuit.

13. A circuit arrangement for use in controlling current flow between an energy source and an electrical load, said circuit arrangement including:
   a switching device including source (S) terminal, Drain (D) terminal and gate (G) terminal;
   a ramp generator including a series connected resistive (R) capacitive (C) circuit, coupled to the source terminal;
   a negative feedback loop including an error amplifier for correlating signals from the drain terminal and signals from the ramp generator to produce an error signal for driving the gate terminal of said switching device wherein the error amplifier includes three transistors (Q2, Q3 and Q4) operatively coupled so that two of the transistors form a parallel configuration which is in series with a third one of said three transistors;
   a first resistor (R6) coupling the third transistor and one of the two transistors to a first potential;
   a first conductor operatively coupling the third transistor to the first potential;
   a second conductor operatively coupling another one of the two transistors to the ramp generator;
   a third conductor operatively coupling the two transistors to a second potential; and
   a fourth conductor operatively coupling the third one of said three transistors to the second potential; and
   a circuit operatively coupled to the circuit arrangement and when activated enable/disable said circuit arrangement.

14. The circuit arrangement of claim 13 further including a voltage adjustment circuit coupling the drain terminal of the switching device and the other one of the two transistors to the first potential and the second potential.

15. An electrical machine including:
   a housing;
   a processor system mounted in the housing;
   a system bus that distributes informational signals coupled to the processor system;
   a power source mounted in the housing;
   a power bus that distributes power signals coupled to the power source;
   at least one connector mounted to the housing, said at least one connector including a first set of electrical contacts operatively coupled to the power bus and a second set of electrical contacts operatively coupled to the system bus;
   an adapter card having a connector with electrical contacts mating with the first set of electrical contacts and the second set of electrical contacts, respectively, when said adapter card is operatively plugged into the at least one connector;
   a hot-swap controller operatively coupled to the electrical contacts mating with said first set of electrical contacts; said hot-swap controller including a switching device operable in at least two modes one of said modes being at least a relatively high resistive mode and a second of said mode being a relatively low resistive mode, a ramp generator operatively coupled to a terminal of said switching device, an error amplifier having a first terminal operatively coupled to the ramp generator and an output terminal operatively coupled to the switching device, and a negative feedback loop coupling a second terminal of said switching device to the error amplifier, said error amplifier being responsive to electrical signals in the negative feedback loop and electrical signals at the ramp generator to generate error signals for driving said switching device through its range of operational modes.

16. The electrical machine of claim 15 wherein the electrical contacts on said at least one connector include pins and the electrical contacts on said adapter card include receptacles.

17. The electrical machine of claim 15 or claim 16 wherein the switching device includes a series-pass P-ch MOSFET transistor.

18. The electrical machine of claim 15 wherein the electrical contacts that are coupled to the power bus are longer than the electrical contacts that are coupled to the system bus.

19. An adapter card for hot-plugging into an electrical machine, said adapter card including:
   a substrate;
   a plurality of electrical and microelectronic components operatively positioned on the substrate and cooperating to provide one or more desired functions;
   a power distribution system operatively disposed on the substrate, said power distribution system including at least an input power port and coupled conductors distributing power to the components;
   a hot-swap interface controller operatively coupled to the power distribution system, said interface controller including a switching device being operable in at least two modes with one of said modes being at least a relatively high resistive mode and a second of said mode being a relatively low resistive mode, a ramp generator including a resistor connected in series with a capacitor, operatively coupled to a terminal of said switching device, an error amplifier having a first terminal operatively coupled to the ramp generator and an output terminal operatively coupled to the switching device, and a negative feedback loop coupling a second terminal of said switching device to the error amplifier, said error amplifier being responsive to electrical signals in the negative feedback loop and electrical signals at the ramp generator to generate error signals for driving said switching device through its range of operational modes; wherein the error amplifier includes a pair of emitter coupled transistors;
   a first resistor connecting the coupled emitters to a first voltage level;
   a conductor connecting a base terminal of one of the emitter coupled transistors to a second voltage level;
   a third transistor having a base terminal connected to the collector terminal of the one of the emitter coupled transistor;
   a second resistor connecting the base terminal of said third transistor to a third voltage level;
   a conductor connecting the collector electrode of the other one of the emitter coupled transistors to the third voltage level; and
   a conductor providing an input to the base electrode of the other one of the emitter coupled transistor.

* * * * *

UNITED STATES PATENT AND TRADEMARK OFFICE
CERTIFICATE OF CORRECTION

PATENT NO. : 6,026,458
DATED : February 15, 2000
INVENTOR(S) : Todd Morgan Rasmus It is certified that error appears in the above-identified patent and that said Letters Patent is hereby corrected as shown below:

Title page,
Item [75], Inventor, replace "Rasums" with -- Rasmus --

Item [75], Inventor, replace "Todd Morgan Rasums, Cary, N.C." with -- Todd Morgan Rasmus, Cary, N.C. --

Signed and Sealed this

Eighteenth Day of December, 2001

Attest:

Attesting Officer

JAMES E. ROGAN
*Director of the United States Patent and Trademark Office*